US009697141B2

(12) United States Patent
Bao et al.

(10) Patent No.: US 9,697,141 B2
(45) Date of Patent: Jul. 4, 2017

(54) LBA BLOCKING TABLE FOR SSD CONTROLLER

(71) Applicant: SK hynix memory solutions inc., San Jose, CA (US)

(72) Inventors: Shengkun Bao, San Jose, CA (US); Kevin Landin, Longmont, CO (US); Ananthanarayanan Nagarajan, Palo Alto, CA (US); Kin Ming Chan, Fremont, CA (US)

(73) Assignee: SK Hynix Memory Solutions Inc., San Jose, CA (US)

( * ) Notice: Subject to any disclaimer, the term of this patent is extended or adjusted under 35 U.S.C. 154(b) by 19 days.

(21) Appl. No.: 14/866,122

(22) Filed: Sep. 25, 2015

(65) Prior Publication Data

US 2016/0110296 A1  Apr. 21, 2016

Related U.S. Application Data

(60) Provisional application No. 62/065,448, filed on Oct. 17, 2014.

(51) Int. Cl.
*G06F 12/00* (2006.01)
*G06F 12/14* (2006.01)
*G06F 13/00* (2006.01)
*G06F 13/28* (2006.01)

(52) U.S. Cl.
CPC ...... *G06F 12/1441* (2013.01); *G06F 12/1483* (2013.01); *G06F 2212/1032* (2013.01); *G06F 2212/1052* (2013.01)

(58) Field of Classification Search
CPC ............ G06F 12/1441; G06F 12/1483; G06F 2212/1032; G06F 2212/1052
See application file for complete search history.

(56) References Cited

U.S. PATENT DOCUMENTS

| | | | | |
|---|---|---|---|---|
| 5,022,004 A | * | 6/1991 | Kurtze | G11C 11/4096 365/189.07 |
| 6,490,635 B1 | * | 12/2002 | Holmes | G06F 3/0605 710/15 |
| 6,832,279 B1 | * | 12/2004 | Potter | G06F 13/405 710/112 |
| 2005/0268058 A1 | * | 12/2005 | Drasnin | G06F 12/1466 711/163 |
| 2009/0119541 A1 | * | 5/2009 | Inoue | G06F 9/4411 714/10 |
| 2013/0304979 A1 | * | 11/2013 | Zimmer | G06F 13/14 711/103 |

* cited by examiner

*Primary Examiner* — Mark Giardino, Jr.
(74) *Attorney, Agent, or Firm* — IP & T Group LLP

(57) ABSTRACT

A host access instruction is received from one of a plurality of channels which are served in parallel. The host access instruction includes an address range of one or more addresses and a type of access. The address range and type of access are compared against a table of stored address ranges and stored types of access associated with any pending host access instructions. It is determined whether to execute the host access instruction based at least in part on the comparison. If it is decided to execute the host access instruction, the host access instruction is forwarded for execution and the address range and the type of access from the host access instruction are stored in the table.

13 Claims, 12 Drawing Sheets

LBA BLOCKING TABLE FOR SSD CONTROLLER

CROSS REFERENCE TO OTHER APPLICATIONS

This application claims priority to U.S. Provisional Patent Application No. 62/065,448 entitled LBA BLOCKING TABLE FOR SSD CONTROLLER filed Oct. 17, 2014 which is incorporated herein by reference for all purposes.

BACKGROUND OF THE INVENTION

Transitioning from a serial interface to a parallel interface may cause new issues to pop up. Some issues which arise during this transition may be particular to solid state storage systems compared to some other types of storage. For example, it may take longer to program solid state storage devices compared to other types of storage media such as hard disk drive (HDD), which makes the solid state storage media inaccessible for longer periods of time when a program operation is being performed. Also, unlike HDD systems, the solid state storage media is sometimes inaccessible because the system needs to do a maintenance or overhead operation on the solid state storage media (e.g., garbage collection or wear leveling). As a result, some issues which were not encountered or only rarely encountered when HDD systems transitioned from a serial interface to a parallel interface may arise when solid state storage systems make the same transition. New solid state storage systems which can address some of these issues would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
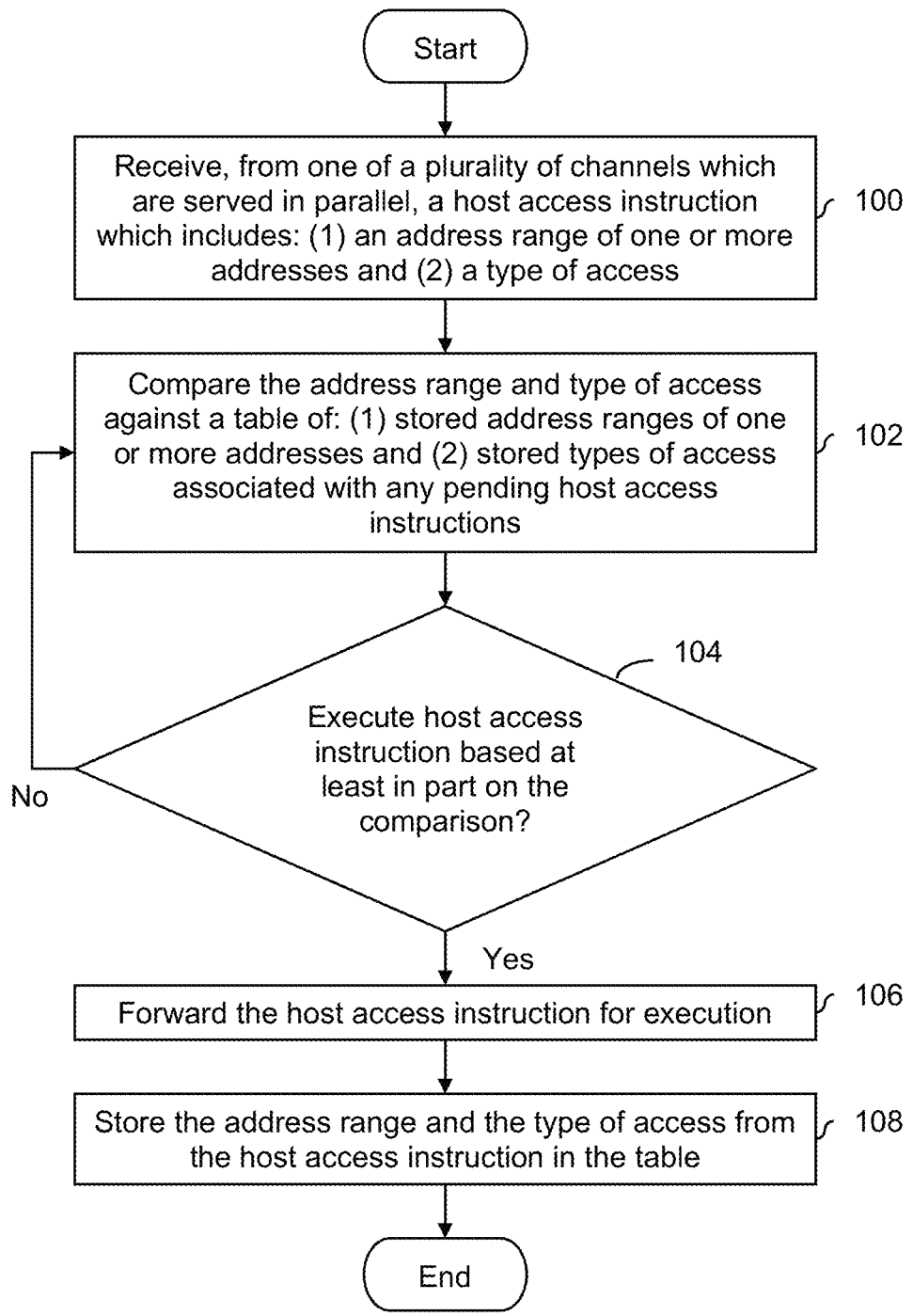
FIG. 1 is a flowchart illustrating an embodiment of a process for performing data integrity checking when multiple commands are processed in parallel in a solid state storage system.

FIG. 1 is a flowchart illustrating an embodiment of a process for performing data integrity checking when multiple commands are processed in parallel in a solid state storage system. In some embodiments, the process is performed by blocking check engine. Generally speaking, the process of FIG. 1 ensures data integrity when multiple channels are served in parallel by only permitting instructions which will not affect the integrity of the data to be executed based on the instructions which are currently pending or outstanding (e.g., instructions which have been sent off for execution, but for which confirmation has not yet been received that those instructions have been completed).

At 100, a host access instruction which includes: (1) an address range of one or more addresses and (2) a type of access is received from one of a plurality of channels which are served in parallel. For example, the address range may be described using a start logical block address (LBA) and an end LBA. The type of access may either be read or write (at least in this example).

In some examples described below, there are 4 channels, queues, or buffers which are serviced in parallel. A host controller may (for example) have 4 command buffers into which the host can enter host access instructions and the 4 channels or buffers are serviced in parallel (e.g., so that if one of the buffers is blocked, the other 3 buffers are not automatically blocked). Naturally, there may be any number of buffers in parallel and the technique is not limited to the configurations described herein.

At 102, the address range and type of access is compared against a table of: (1) stored address ranges of one or more addresses and (2) stored types of access associated with any pending host access instructions. For example, there may be table which includes the start LBA, the end LBA, and the access type for each pending instruction and the information stored therein is compared to the addresses and access types from the instruction being evaluated. Some specific examples of host access instructions which would be permitted to pass and not pass (based on various stored information at the time) are described in more detail below. In some examples described below, the table is referred to as an LBA blocking table.

At 104, it is determined whether to execute the host access instruction based at least in part on the comparison. As described above, the process of FIG. 1 will (generally speaking) permit a particular host access instruction to be performed if it will not affect the integrity of the stored data (e.g., based on the information in the LBA blocking table). If a particular host access instruction will affect the integrity of the stored data, then it will not be executed (e.g., at least until some earlier blocking instruction completes). For example, if it is decided not to execute the host access instruction at step 104, then the process returns to step 102 (e.g., where the stored information in the table may or may not have changed since the last comparison).

If it is decided to execute the host access instruction at step 104 then the host access instruction is forwarded for execution at 106. For example, the checking may be performed by some integrity checking logic (e.g., a blocking check engine) and the actual execution of commands may be performed using some other logic (e.g., a direct memory access (DMA) path or PCIe path).

At 108, the address range and the type of access from the host access instruction is stored in the table. With the host access instruction sent off for execution, a corresponding entry needs to be created in the LBA blocking table. Until some indication is received that the host access instruction has completed, the address range and the type of access from the host access instruction are stored in the table to prevent any data corruption or invalid data being returned due to conflicting or colliding instructions.

Solid state storage has performance characteristics that are unique to it and which are not relevant to hard disk drive (HDD) storage. For example, solid state storage systems occasionally need to perform maintenance operations on the solid state storage drive or media itself, such as garbage collection or wear leveling. While this is happening, host access instructions cannot be serviced. And as the NAND storage gets older and/or fuller, overhead operations will need to be performed more frequently.

Another issue with solid state storage is that higher-density cells take longer to program than lower-density cells. With multi-level cells (MLC), there are two bits per cell. With tri-level cells (TLC), there are three bits per cell. Programming MLC and TLC solid state storage requires multiple passes or iterations of charging (e.g., each time putting an additional amount of charge into each cell) and higher-density cells tend to require more programming time than lower-density cells.

As a result, it may take some time before a host access command is actually executed in a solid state storage system. As such, the number of pending host access instructions may be higher in solid state storage systems compared to similar HDD systems which also service multiple channels in parallel. In other words, solid state storage systems have higher exposure to data integrity issues, whereas HDD systems may have little or no exposure to data integrity issues (i.e., because there are fewer pending host access instructions in HDD systems when a new host access instruction comes in).

The process of FIG. 1 solves the data integrity issue by checking new host access instructions against the stored information for pending host access instructions. This ensures that no host access instruction will be executed which could corrupt any stored data and/or cause invalid data to be returned.

In some embodiments, the process of FIG. 1 is performed by hardware, such as a semiconductor device (such as an application-specific integrated circuit (ASIC) or a field-programmable gate array (FPGA)), as opposed to firmware (e.g., instructions which are performed by an embedded microprocessor). One benefit is that hardware is faster than firmware, so the process of checking received host access instructions against a table and releasing the information from the table is performed quickly.

Another benefit is that the firmware can be free to do other things while the hardware checks as many times as needed for a blocking instruction to be cleared from the table. If firmware performed the process of FIG. 1, then it may not have enough processing resources to do other things. Other benefits are described in more detail below.

While the process of FIG. 1 is being performed, another process independently works to free stored information from the table once confirmation has been received that a particular host access instruction has been completed. The following figure shows an example of this.

Figure 2:
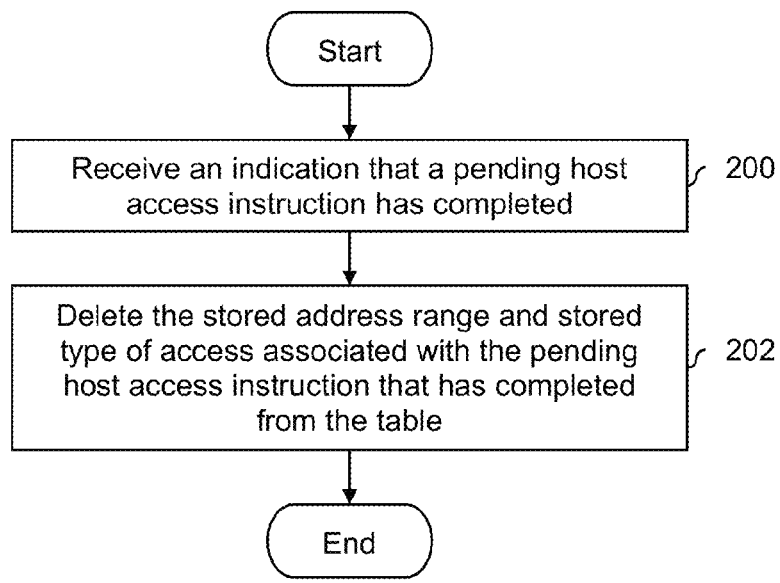
FIG. 2 is a flowchart illustrating an embodiment of a process for clearing a stored address range and a stored type of access from a table.

FIG. 2 is a flowchart illustrating an embodiment of a process for clearing a stored address range and a stored type of access from a table. In some embodiments, the process is performed by a blocking release interface (e.g., which interfaces with a NAND controller) and in some embodiments (for reasons similar to those described above) the process is performed by hardware.

At 200, an indication is received that a pending host access instruction has completed. For example, a blocking release interface may perform the process of FIG. 2 where the blocking release interface communicates with and/or interfaces with a NAND controller. The NAND controller may issue acknowledgements that a specified and pending host access instruction has completed.

At 202, the stored address range and stored type of access associated with the pending host access instruction that has completed are deleted from the table. This removes the stored information associated with a previously-pending host access instruction from the table. If the previously-pending host access instruction was blocking another host access instruction, then the next time a check is performed at step 104 in FIG. 1, the information associated with the blocking instruction will be gone and the host access instruction can be sent off for execution.

The following figure shows an example of a solid state storage system which performs the processes of FIGS. 1 and 2.

Figure 3:
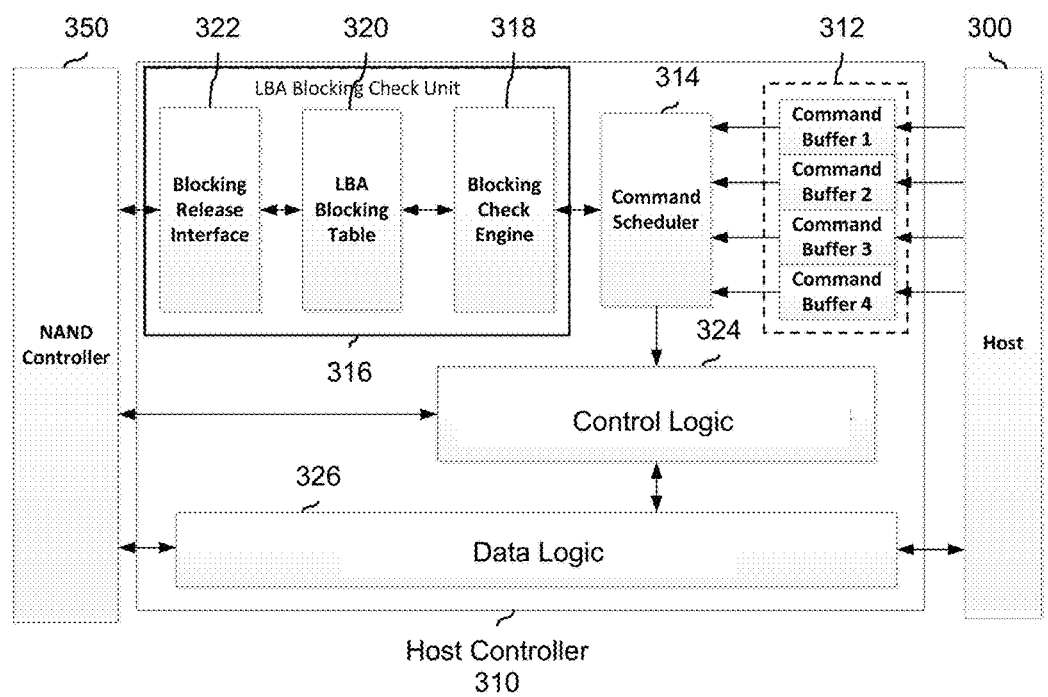
FIG. 3 is a system diagram illustrating an embodiment of a solid state storage system.

FIG. 3 is a system diagram illustrating an embodiment of a solid state storage system. In the example shown, host access instructions are issued by host 300. Host 300 has four command buffers (312) in host controller 310 into which host access instructions (e.g., host reads or host writes) are written or otherwise passed along. For example, host 300 may have four queues (e.g., corresponding to different levels of service, different applications, etc.) and each of the four queues has a corresponding command buffer. Having multiple command buffers enables host access instructions to be passed on to and/or serviced by host controller 310 even if one of the host access commands in buffers 312 is temporarily kept there (e.g., because of a pending instruction which blocks that host access command from leaving command buffers 312). To put it another way, the system does not hang even if a host access instruction has to remain in one of the command buffers 312 for some time.

Blocking release interface 322, LBA blocking table 320, and blocking check engine 318 are part of LBA blocking check unit 316. LBA blocking check unit 316 ensures the data integrity of the solid state storage system, even while multiple channels are serviced in a parallel and/or if it takes a long time for NAND controller 350 to complete host access instructions (e.g., because of overhead operations unique to solid state storage and/or because higher-density solid state storage cells take longer to program compared to lower-density solid).

Command scheduler 314 checks the host access instructions in command buffers 312 and passes the address range (e.g., start LBA and end LBA) and type of access (e.g., read or write) to blocking check engine 318. Blocking check engine 318 performs the process of FIG. 1 and compares the address range and type of access received from command scheduler 314 against the information stored in LBA blocking table. Blocking check engine 318 then informs command scheduler 314 whether a particular host access instruction can be executed or not.

Initially, when host controller 310 has yet to receive any host access instructions from host 300, LBA blocking table 320 is empty. Once host access instructions start coming in from host 300, LBA blocking table 320 is filled with information from pending host access instructions until it is confirmed that a particular host access instruction has been completed.

If a host access instruction can be executed (e.g., because blocking checking engine 318 has confirmed that there is no information stored in LBA blocking table 320 which blocks that host access instruction from being executed), then the host access instruction is performed using control logic 324 (e.g., which specifies whether the type of access is a read or a write, as well as the address range in question) and data logic 326 (e.g., for sending write data to NAND controller 350 or for returning read data from NAND controller 350, such as a DMA). Not shown beyond NAND controller 350 is the NAND (or, more generally, solid state) storage media or drive itself.

If a host access instruction cannot be executed (at least at that time), the host access instruction remains in its command buffer until the information which is blocking it is removed from LBA blocking table 320 and the held host access instruction can be performed without corrupting any stored data and/or causing invalid data to be returned. Periodically, command scheduler 314 and/or blocking check engine 318 will initiate a check on any held or new host command instruction in command buffers 312.

To clear the information stored in LBA blocking table 320, blocking release interface 322 performs the process of FIG. 2. For example, when confirmation is received from NAND controller 350 that a particular host access command has been completed, the corresponding information stored in LBA blocking table 320 is removed by blocking release interface 322.

The following figures illustrate more detailed examples of pending host access instructions which do and do not block a host access instruction in command buffers 312 based on the stored information at that time. These are some examples of the decision making at steps 102 and/or 104 in FIG. 1 to determine whether to let a host access instruction be performed or not.

Figure 4:
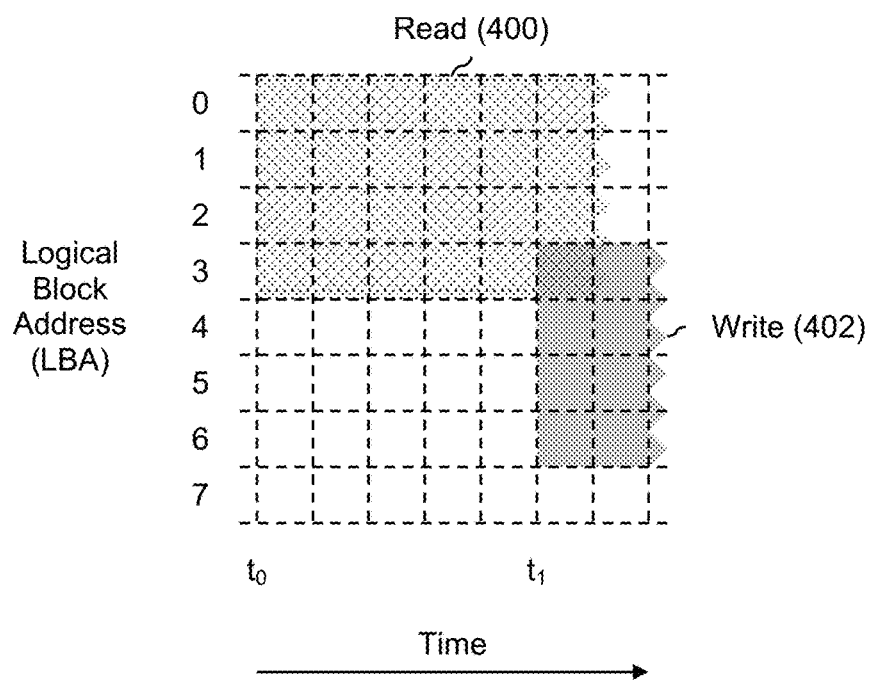
FIG. 4 is a diagram illustrating an embodiment of a read which blocks a later write.

FIG. 4 is a diagram illustrating an embodiment of a read which blocks a later write. In the example shown, a read instruction (400) is received at time $t_0$. The read instruction is to the LBA range 0-3.

Later, at time $t_1$, a write instruction (402) is received. The write instruction is to the LBA range 3-6, which overlaps with the LBA range of read instruction (400) because both are addressed to LBA 3. Since confirmation has not yet been received that read instruction 400 has completed, the write instruction (402) is not executed because it can potentially corrupt LBA 3. For example, if write instruction 402 somehow got ahead of read instruction 400, then the newer (but wrong) data would be returned by read instruction 400. Read instruction 400 should properly return the old data (i.e., before it is changed by write instruction 402).

Once confirmation is received that read instruction 400 has completed (not shown) and the stored information in the LBA blocking table associated with read instruction 400 has been deleted, write instruction 402 would be permitted to execute at the next check.

Figure 5:
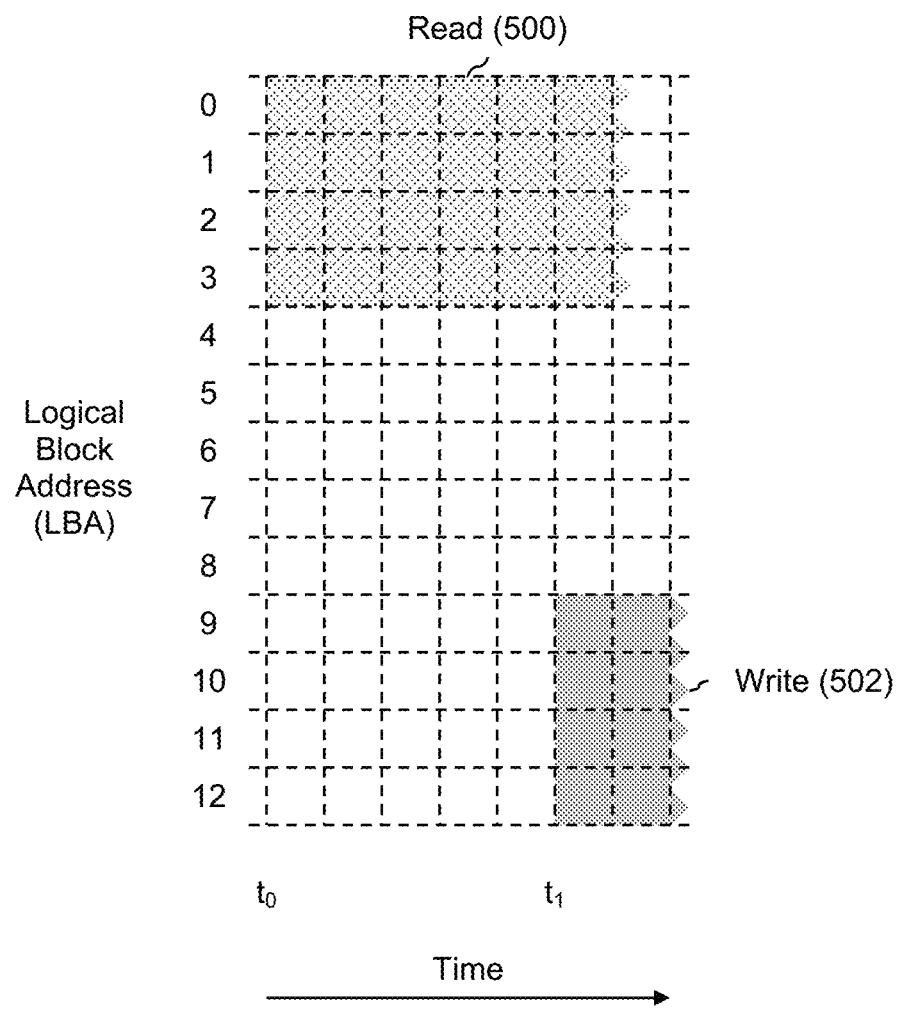
FIG. 5 is a diagram illustrating an embodiment of a read which does not block a later write.

FIG. 5 is a diagram illustrating an embodiment of a read which does not block a later write. In this example, a read instruction (500) to LBA 0-3 is received at time $t_0$. Later, at time $t_1$, a write instruction (502) to LBA 9-12 is received. Since the LBA ranges do not overlap in this example, the two instructions can be performed simultaneously without fear of data corruption. As such, write instruction 502 would be permitted to be performed at time $t_1$.

Figure 6:
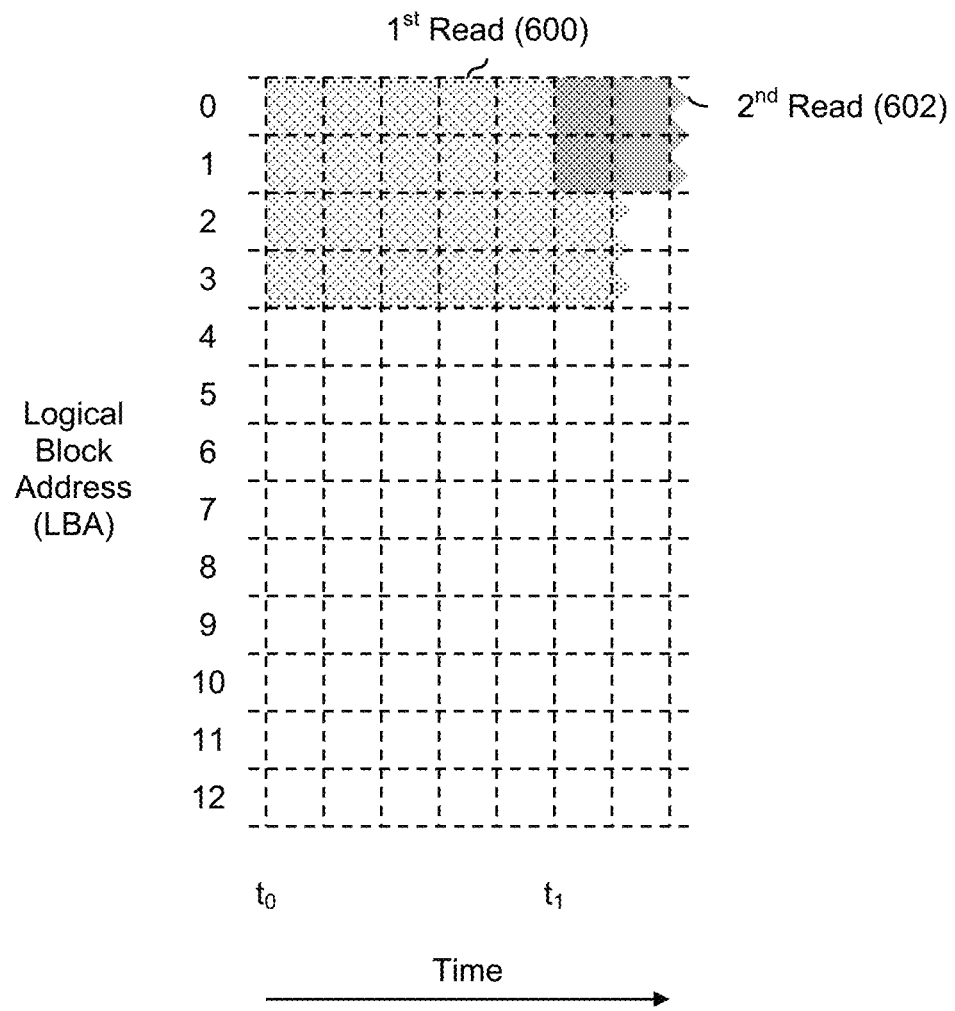
FIG. 6 is a diagram illustrating an embodiment of a read which does not block a later read.

FIG. 6 is a diagram illustrating an embodiment of a read which does not block a later read. In this example, a first read instruction (600) is received at time $t_0$. For this first read, the LBA range 0-3 is read. Later, at time $t_1$, a second read instruction (602) to LBA range 0-1 is received. Since both of the instructions are read type instructions, they will not corrupt any stored data and/or cause any invalid data to be returned, even though the address ranges overlap (both read LBA 0 and 1). As such, the second read instruction (602) is permitted to be performed at time $t_1$.

The following figure describes the examples shown in FIGS. 4-6 in a more formal manner.

Figure 7:
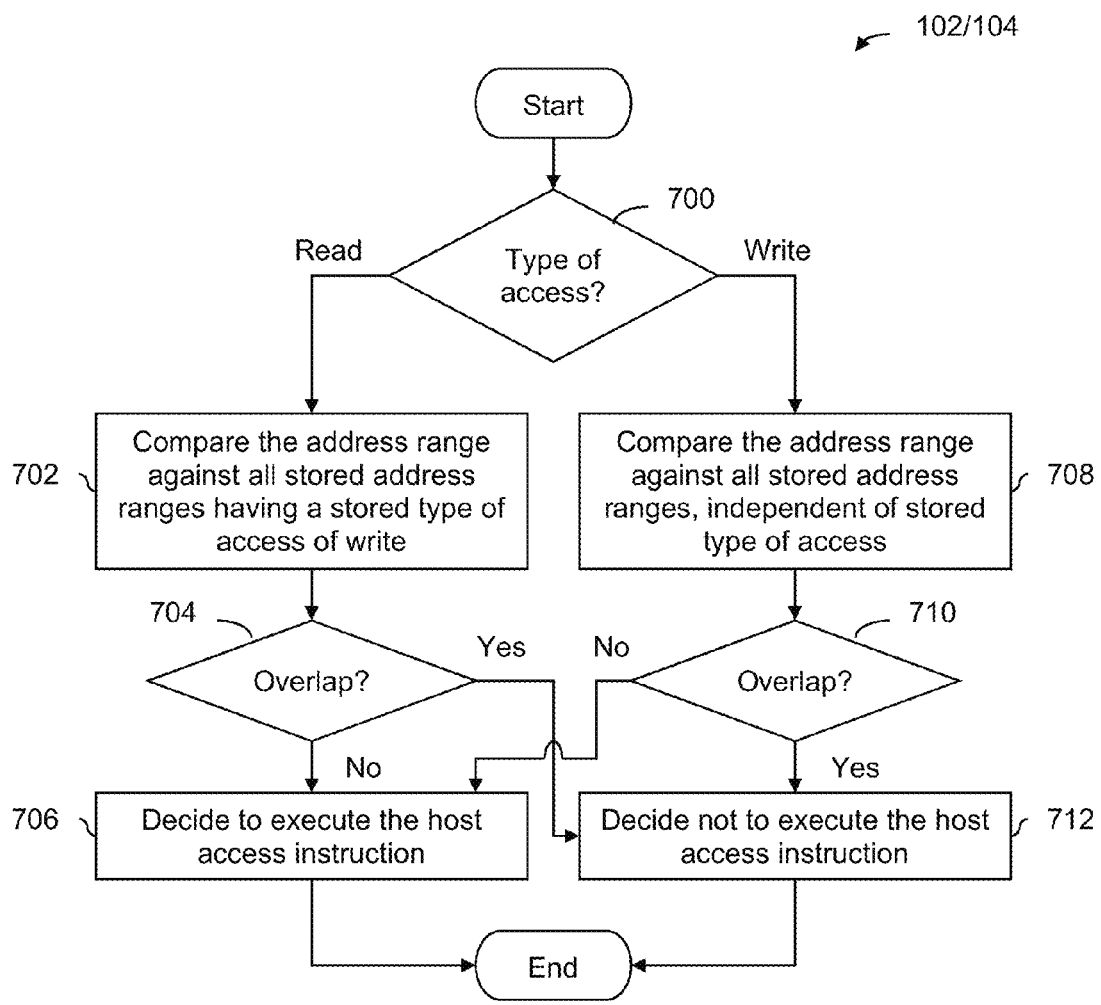
FIG. 7 is a flowchart illustrating an embodiment of a process to determine whether to execute a host access instruction.

FIG. 7 is a flowchart illustrating an embodiment of a process to determine whether to execute a host access instruction. In some embodiments, the process is used at step 102 and/or 104 in FIG. 1.

At 700, the type of access is determined. In the examples of FIGS. 4-7, a host access instruction is either a read or a write.

If it is a read at 700, then the address range (e.g., associated with the read) is compared against all stored address ranges having a stored type of access of write at 702. In other words, step 702 will ignore any stored address ranges in the LBA blocking table which are associated with pending read instructions. Step 702 only considers stored address ranges in the LBA blocking table that are associated with pending write instructions. This is because a later read instruction needs to wait until an earlier, pending write instruction (with at least some addresses in common) completes, but it does not need to wait for an earlier, pending read instruction to complete (even if that earlier read instruction has overlapping addresses).

It is determined at 704 if there is any overlap (e.g., in the relevant addresses specified in step 702). If so, it is decided not to execute the host access instruction at 712. If there is no overlap at 704, then it is decide to execute the host access instruction at 706. For example, in FIG. 6, the check of the second read instruction (602) passed the test and it was decided to execute the second read instruction.

Returning to step 700, if it is a write, then the address range (e.g., associated with the write) is compared against all stored address ranges, independent of stored type of access at 708. For write instructions, all stored address ranges in the LBA block table are checked because write instructions need to wait for all pending writes instructions with overlapping addresses, as well as all pending read instructions with overlapping addresses, to complete. In the case of the former, the stored data would be corrupted if somehow the two write instructions were executed out of order. In the case of the latter, old and invalid data could potentially be returned by the read instruction if the write instruction was somehow executed before the read instruction.

It is determined at 710 if there is any overlap (e.g., in the relevant addresses specified in step 708). If there is none, then it is decided to execute the host access instruction at 706. For example, in FIG. 5, write instruction 502 passed the check and is performed at time $t_1$. If there is some overlap at 710, then it is decided not to execute the host access instruction at 712. For example, in FIG. 4, write instruction 402 did not pass the check and is not performed at time $t_1$.

One benefit to having hardware perform integrity checking is that firmware can offload integrity checking to hardware for channels, ports, storage, and/or other things besides NAND storage. The following figure shows an example of this.

Figure 8:
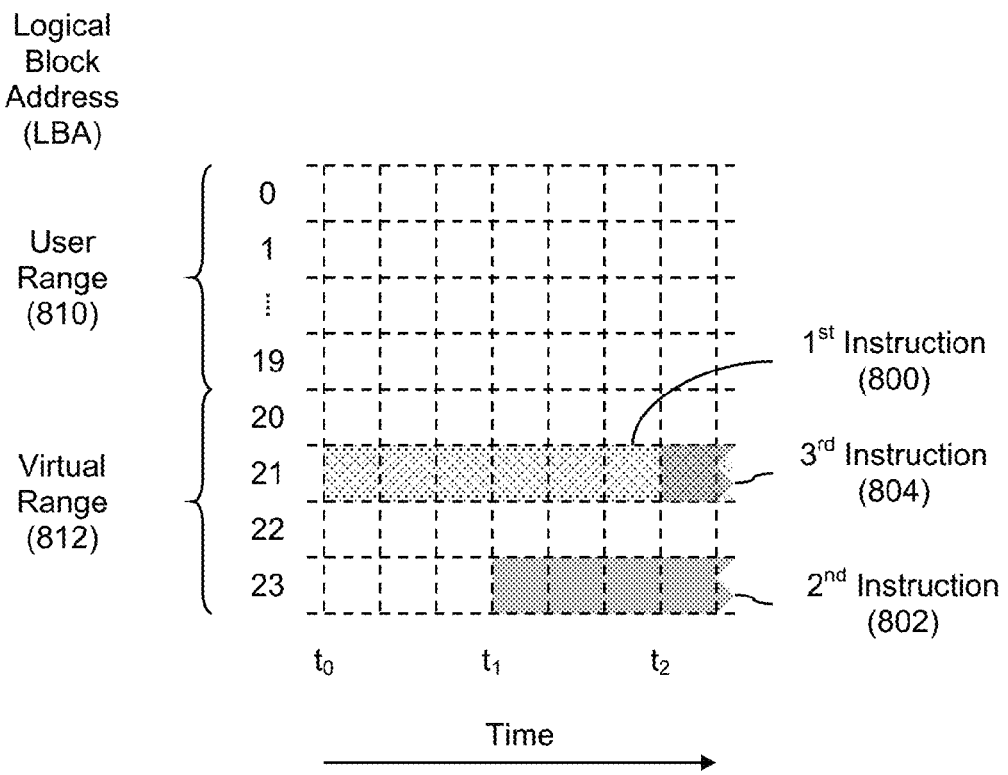
FIG. 8 is a diagram illustrating an embodiment of a virtual range of addresses used to perform integrity checking for other things besides NAND storage.

FIG. 8 is a diagram illustrating an embodiment of a virtual range of addresses used to perform integrity checking for other things besides NAND storage. In the example shown, user range 810 corresponds to LBA addresses 0-19. In this example, the NAND storage (not shown) has 20 addresses and so host access instructions will always be directed to addresses strictly in the range of 0-19 and never beyond that range.

Virtual range 812 includes LBA addresses 20-23. The virtual range is beyond or outside of the scope of the NAND storage and represents or corresponds to things other than NAND storage for which firmware wants integrity checking performed. For example, the firmware may have to ensure data integrity or command ordering for SCSI commands. Each of the virtual addresses in virtual range 812 may correspond to a logical unit or other shared resource. With virtual range 812, firmware can offload integrity checking to hardware, which permits firmware to have processing resources for other things.

In the example shown, a first instruction (800) is received at time $t_0$. The instruction is directed to LBA 21 in virtual range 812. Since there are no earlier instructions, the first instruction is permitted to be performed when blocking checking is performed for it.

At time $t_1$, a second instruction (802) directed to LBA 23 is received. Since the addresses associated with first instruction 800 and second instruction 802 do not overlap, the second instruction is permitted to be performed when blocking checking is performed for it.

At time $t_2$, a third instruction (804) directed to LBA 21 is received. Since the address matches that of the first instruction (800) and the first instruction is still pending, the first instruction blocks the third instruction and the third instruction is not permitted to be performed (at least in this example) when blocking checking is performed for it. At some subsequent time when an indication is received that the first instruction has completed, the third instruction can be performed.

In some embodiments, hardware exposes a set of registers to firmware which makes the integrity checking associated with virtual range 812 configurable or otherwise adjustable. These bits may, for example, enable firmware to configure what types of access (instructions) block other types of access (instructions) and/or what types of access (instructions) can be performed simultaneously without jeopardizing data integrity. For generality, the types of access (instructions) may not necessarily be referred to a read access or write access, but may simply be a first type of access (instruction), a second type of access (instruction), etc. This generalization of access (instruction) types and configurable integrity checking enables firmware to use the hardware integrity checking for a variety of scenarios and/or applications.

In some embodiments, firmware locks the NAND storage using a firmware access instruction. The following figure shows an example of this.

Figure 9:
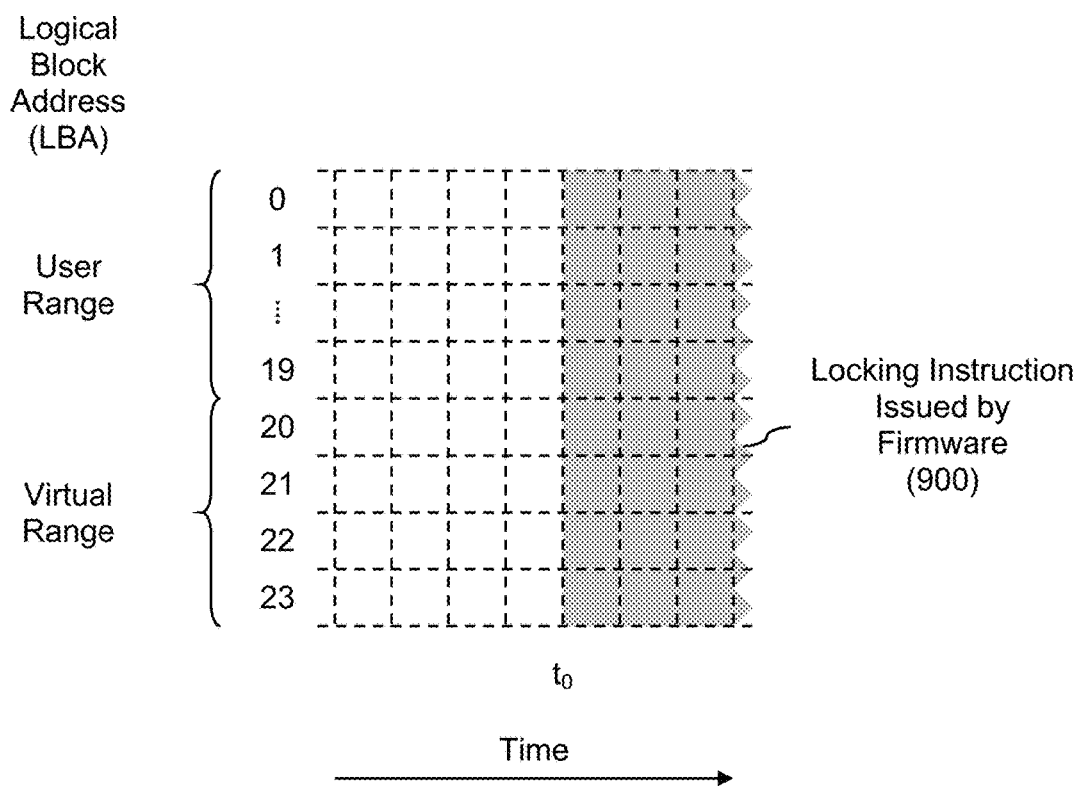
FIG. 9 is a diagram illustrating an embodiment of a locking instruction issued by firmware.

FIG. 9 is a diagram illustrating an embodiment of a locking instruction issued by firmware. In the example shown, at time $t_0$, a locking instruction (900) is issued by firmware (e.g., as opposed to the host so that in FIG. 3, such an instruction would not come from host 300 via command buffer 312 and command scheduler 314). In this particular example, locking instruction 900 is directed to all addresses in the user range as well as the virtual range.

In this particular example, instruction 900 is used by firmware to lock the NAND storage. For example, an LBA blocking check unit (not shown) will record the information associated with locking instruction 900 in an LBA blocking table. Since locking instruction 900 is directed to all addresses, the corresponding entry in the LBA blocking table will cause all subsequent instructions (e.g., from the host and/or directed to the NAND storage) to be held until firmware issues a corresponding acknowledgment or confirmation that the locking instruction has been "executed" (where executed is in air quotes because the locking command may be a dummy command). Instruction 900 essentially locks the NAND storage until firmware unlocks it.

While the NAND storage is locked, the firmware may (if desired) perform operations such as adjusting some configuration or setting where it is desirable to adjust such settings when the NAND storage is quiescent (e.g., adjusting a voltage threshold used to read the NAND storage, or adjust a programming setting which controls how much incremental charge is added during a sequence of programming pulses, etc.). Then, the firmware releases the lock by issuing an acknowledgement (not shown) which causes the stored information associated with locking instruction 900 to be deleted from the LBA blocking table.

Figure 10:
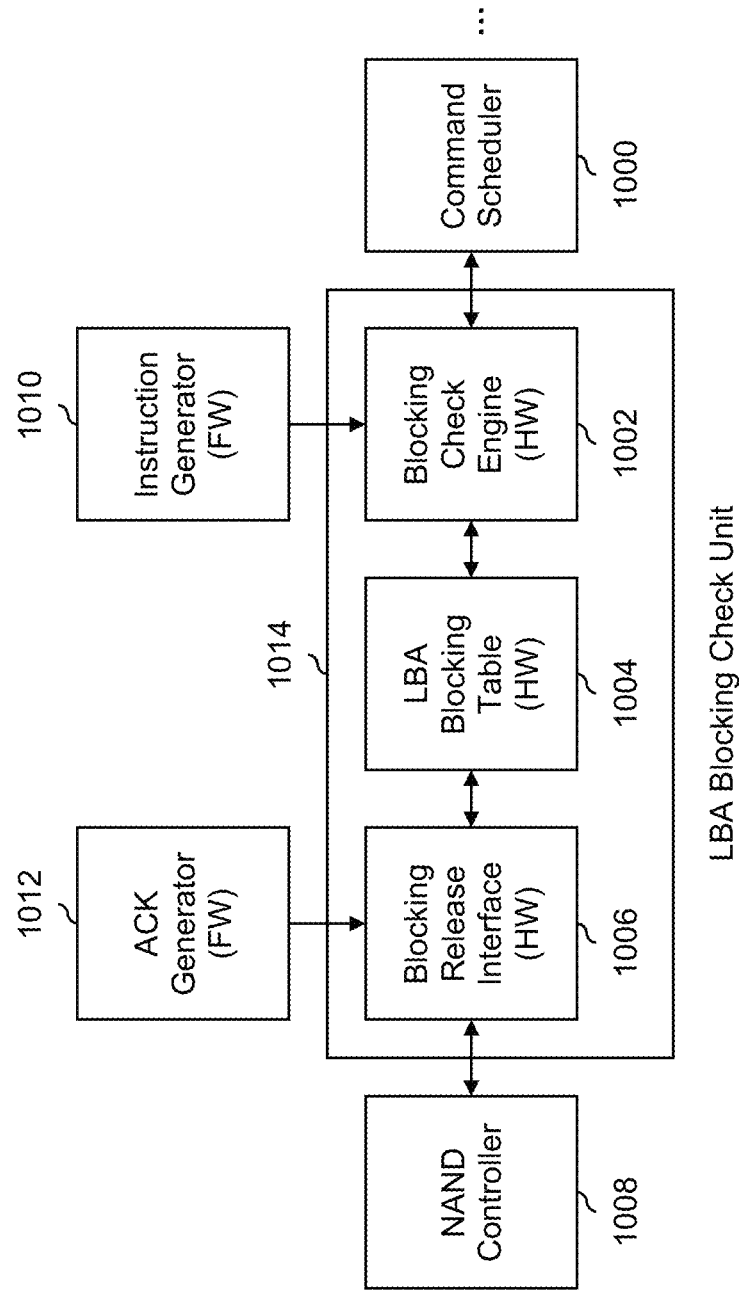
FIG. 10 is a diagram illustrating an embodiment of a system in which firmware generates locking instructions and corresponding acknowledgments to a hardware-implemented LBA blocking check unit.

FIG. 10 is a diagram illustrating an embodiment of a system in which firmware generates locking instructions and corresponding acknowledgments to a hardware-implemented LBA blocking check unit. In the example shown, LBA blocking check unit 1014 (which includes blocking check engine 1002, LBA blocking table 1004, and blocking release interface 1006) is implemented in hardware. Sitting on top of blocking check engine 1002 is instruction generator 1010 which is implemented in or otherwise performed by firmware. Instruction generator 1010 generates locking instructions such as locking instruction 900 from FIG. 9. If needed, instruction generator 1010 changes any registers before issuing an instruction to blocking check engine 1002.

Instructions may also be received from a host via command scheduler 1000 (see, e.g., the complete diagram shown in FIG. 3). To differentiate between the two types of instructions evaluated by blocking check engine 1002, instructions from a host may be referred to herein as host access instructions and instructions from instruction generator 1010 (i.e., firmware) may be referred to as firmware access instructions.

To release the locking instruction generated by instruction generator 1010 (e.g., after firmware has done whatever it wanted to do while the NAND storage was locked), acknowledgement generator 1012 (which is implemented in or otherwise performed by firmware) generates an acknowledgement so that a locking entry in LBA blocking table 1004 can be deleted. If needed, acknowledgement generator 1012 also returns any setting or configurations to their previous value (e.g., so read instructions do not block subsequent read or write instructions).

In addition to the acknowledgments received from firmware, blocking release interface 1006 may receive other acknowledgments or confirmations from NAND controller 1008.

Returning to the locking instruction example shown in FIG. 9, using a traditional read or write instruction to lock the NAND storage may not work for a variety of reasons. A traditional read instruction would not work because they are not effective at blocking later read or write instructions. A traditional write instruction would not work because writing to all addresses would first require all addresses to be read and for all of that read data to be stored (which is a very large amount of data) so that the locking write instruction does not corrupt the data stored in the NAND storage. Practically speaking, it would take a long time to do the read and there would not be enough storage in firmware to store the read data.

To solve this problem, in some embodiments a third type of access or instruction is defined (e.g., neither a read instruction nor a write instruction) which a blocking check engine will recognize as a type of instruction which blocks all other types of instructions and/or blocking check engine will recognize as a dummy instruction not to actually be passed on to a NAND controller (e.g., via control logic 324 or data logic 326 in FIG. 3). For simplicity, if we called this a locking instruction, the blocking check engine will realize (when it sees stored information associated with a locking instruction in an LBA blocking table) that subsequent read instructions and write instructions cannot be performed so long as that locking instruction is pending. This would effectively lock the NAND storage.

Alternatively, some systems have registers exposed by hardware which enable firmware to change the blocking rules for different types of access or instructions (described above). In some such systems, the firmware (e.g., before the blocking instruction is issued) changes the settings of the hardware so that read instructions will block subsequent read instructions as well as write instructions. The firmware then issues a read instruction to all addresses. With the new configuration, the NAND storage will be effectively locked by a read instruction until firmware generates an acknowledgement. Once the lock is released, the settings may be returned to their previous configuration.

If a read instruction is used as a locking instruction, instruction generator 1010 may be configured to have the locking, read instruction be directed to all addresses in the user range as well as the virtual range. This is so that blocking check engine 1002 can recognize that read instruction as one for which an entry should be created in LBA blocking table 1004, but also an instruction which should not be passed along to NAND controller 1008 (e.g., via some control logic and data logic which are not shown). It would not be desirable (for example) if the NAND controller received the locking, read instruction and issued an acknowledgment for it because this might prematurely unlock the NAND storage. Rather, control of when the acknowledgment for the locking, read instruction is generated should rest solely with firmware (i.e., acknowledgement generator 1012).

The following figures describe the locking processes described above in a more formal manner. First, a process which uses a third type of instructions (e.g., other than a read or a write) is described. Then, a process which adjusts settings or configurations to use a read instruction as a locking instruction is described.

Figure 11:
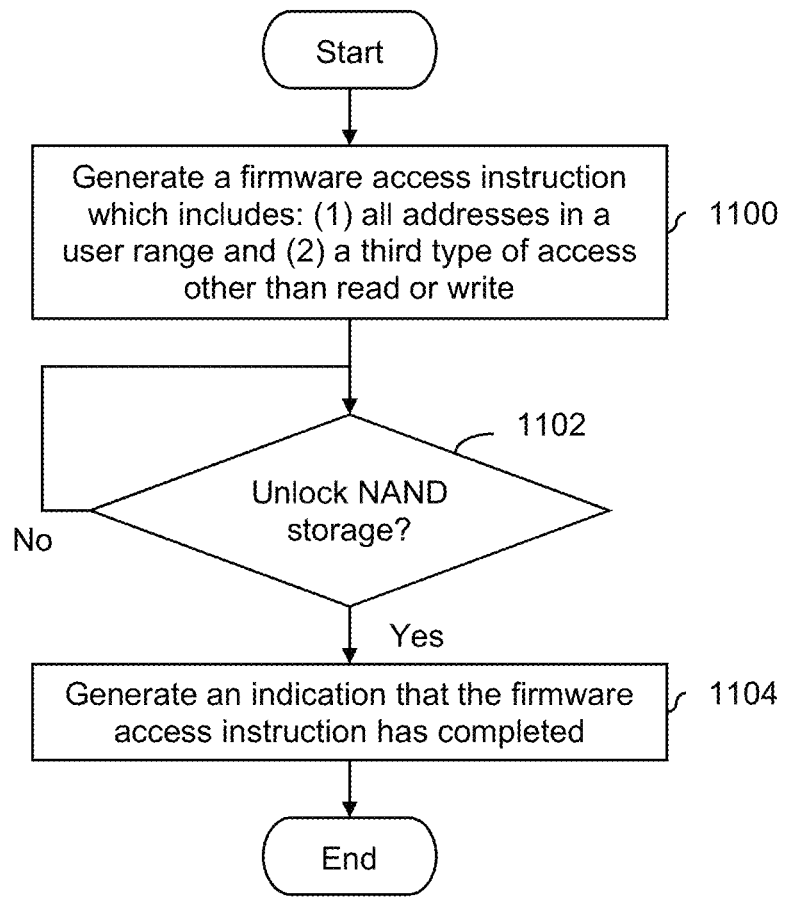
FIG. 11 is a flowchart illustrating an embodiment of a process for generating a locking instruction using an instruction other than a read or a write.

FIG. 11 is a flowchart illustrating an embodiment of a process for generating a locking instruction using an instruction other than a read or a write. In some embodiments, the process is performed by firmware. To put FIGS. 1 and 11 into context with each other, FIG. 11 may be performed in combination with FIG. 1 (e.g., where FIG. 1 is performed by hardware and FIG. 11 is performed by firmware).

At 1100, a firmware access instruction which includes: (1) all addresses in a user range and (2) a third type of access other than read or write is generated. In the example of FIG. 10, instruction generator 1010 is an example of a block or component which performs step 1100. The third type of access may be signaled or indicated in a variety of ways. For example, there may be some field which identifies the instruction type and that field may be set accordingly. Or, there may some signals in some interface between instruction generator 1010 and blocking check engine 1002 in FIG. 10 which are set accordingly. In some embodiments, the firmware access instruction generated at 1100 is also directed to all addresses in a virtual range.

At 1102, it is determined whether to unlock the NAND storage. For example, the firmware may want to do some tasks while the NAND storage is locked.

If it decided to not unlock the NAND storage at 1102, then the process waits at step 1102 until the process decides to unlock the NAND storage. Once it is decided to unlock the NAND storage at 1102, an indication that the firmware access instruction has completed is generated at 1104. For example, acknowledgement generator 1012 in FIG. 10 may perform this step.

Figure 12:
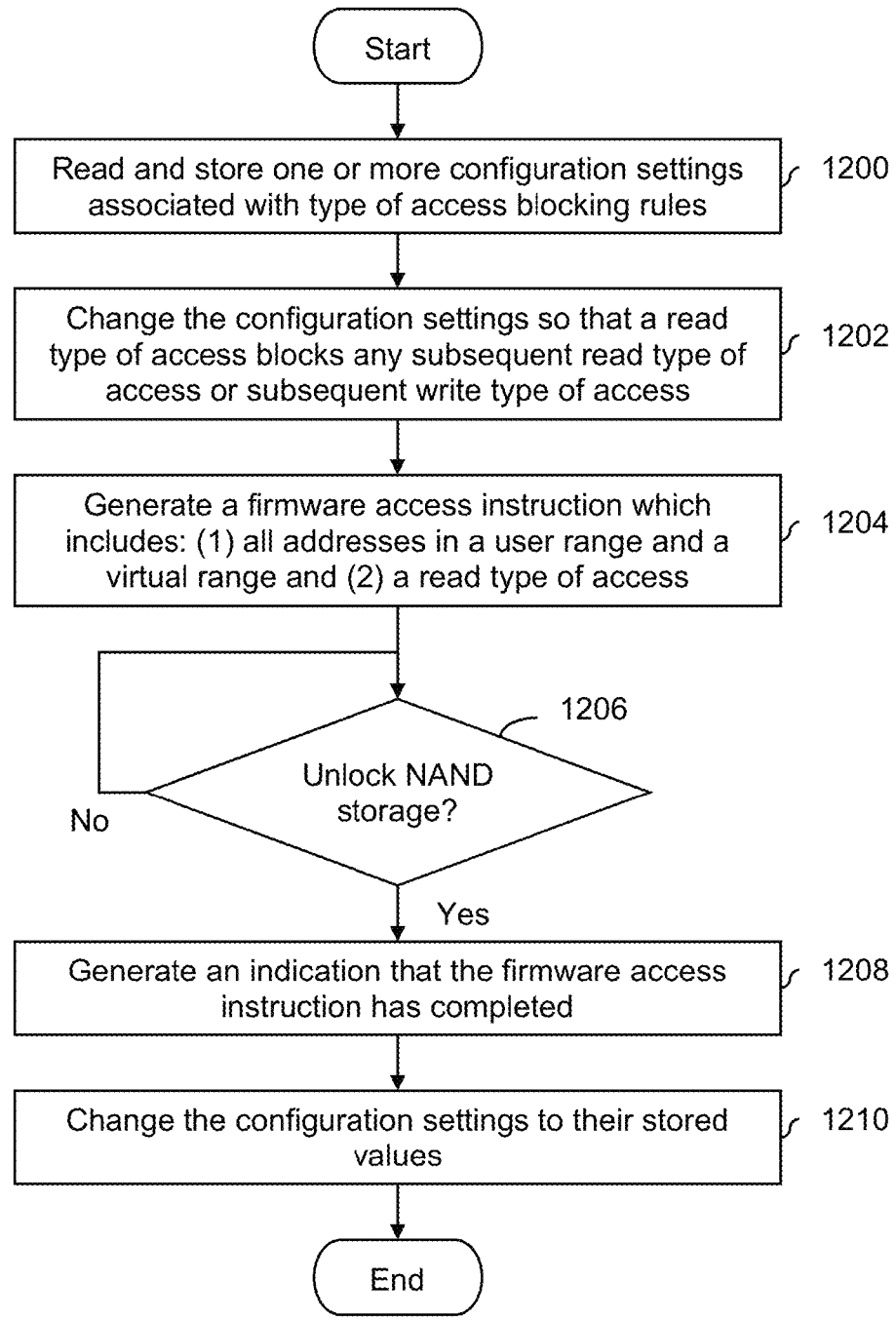
FIG. 12 is a flowchart illustrating an embodiment of a process for generating a locking instruction by adjusting configuration settings and using a read instruction.

FIG. 12 is a flowchart illustrating an embodiment of a process for generating a locking instruction by adjusting configuration settings and using a read instruction. Similar to FIG. 11, the process may be performed by firmware and may be performed in combination with FIG. 1 (e.g., where FIG. 1 is performed by hardware and FIG. 12 is performed by firmware).

At 1200, one or more configuration settings associated with type of access blocking rules are read and stored. This is so the system can be returned to its original state once the NAND storage is unlocked.

At 1202, the configuration settings are changed so that a read type of access blocks any subsequent read type of access or subsequent write type of access. This will enable a read instruction (generated by firmware and directed to all addresses) to block subsequent instructions, effectively locking the NAND storage.

At 1204, a firmware access instruction is generated which includes: (1) all addresses in a user range and a virtual range and (2) a read type of access. For the reasons described above, it may be desirable to have a locking, read instruction be directed to all addresses in the user range as well as the virtual range. In the example of FIG. 10, instruction generator 1010 may perform steps 1200-1204.

At 1206 it is determined whether to unlock the NAND storage. If it decided to not unlock the NAND storage at 1206, then the process waits at step 1206 until the process decides to unlock the NAND storage. Once it is decided to unlock the NAND storage at 1206, an indication that the firmware access instruction has completed is generated at 1208. At 1210, the configuration settings are changed to their stored values. In the example of FIG. 10, steps 1208 and 1210 may be performed by acknowledgement generator 1012.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a blocking check engine configured to:
  receive, from one of a plurality of channels which are served in parallel, a host access instruction which includes: (1) an address range of one or more addresses and (2) a type of access;
  compare the address range and type of access against a table of: (1) stored address ranges of one or more addresses and (2) stored types of access associated with any pending host access instructions, the types of access include a third type of access or a blocking read type of access, the third type of access is a type of access other than the blocking read type of access, a read type of access, or a write type of access;
  determine whether to execute the host access instruction based at least in part on the comparison; and
  in the event it is determined to execute the host access instruction: forward the host access instruction for execution; and
  store the address range and the type of access from the host access instruction in the table; and
execute an unlocking procedure, the unlocking procedure is configured to:
  generate a firmware access instruction which includes: (1) all addresses in a user range and (2) the third type of access, determine whether to unlock NAND storage, and in the event it is determined to unlock the NAND storage, generate an indication that the firmware access instruction has completed; or read and store one or more configuration settings associated with type of access blocking rules, change the configuration settings to a blocking read type of access setting, so that the blocking read type of access blocks any subsequent read type of access or subsequent write type of access, generate the firmware access instruction which includes: (1) all the addresses in the user range and a virtual range and (2) the blocking read type of access, determine whether to unlock the NAND storage, and in the event it is determined to unlock the NAND storage, generate the indication that the firmware access instruction has completed, and change the configuration settings to their stored values.

2. The system recited in claim 1 further comprising a blocking release interface configured to:
receive an indication that a pending host access instruction has completed; and
delete the stored address range and stored type of access associated with the pending host access instruction that has completed from the table.

3. The system recited in claim 1, wherein the system includes a semiconductor device, including one or more of the following: an application-specific integrated circuit (ASIC) or a field-programmable gate array (FPGA).

4. The system recited in claim 3, further comprising:
an embedded microprocessor; and
a memory coupled to the embedded microprocessor, wherein the memory is configured to provide the embedded microprocessor with instructions causing the embedded microprocessor to execute the unlocking procedure.

5. The system recited in claim 1, wherein the blocking check engine is configured to determine whether to execute the host access instruction, including by:
determining the type of access;
in the event it is determined that the type of access is the read type of access:
  comparing the address range against all stored address ranges having a stored type of access of write;
  determining if there is an overlap between (1) the address range and (2) all stored address ranges having the stored type of access of write;
  in the event it is determined that there is the overlap between (1) and (2), deciding not to execute the host access instruction; and
  in the event it is determined that there is no overlap between (1) and (2), deciding to execute the host access instruction; and
in the event it is determined that the type of access is the write type of access:
  comparing (3) the address range against (4) all stored address ranges, independent of stored type of access;
  determining if there is an overlap between (3) and (4);
  in the event it is determined that there is the overlap between (3) and (4), deciding not to execute the host access instruction; and
  in the event it is determined that there is no overlap between (3) and (4), deciding to execute the host access instruction.

6. A method, comprising:
receiving, from one of a plurality of channels which are served in parallel, a host access instruction which includes: (1) an address range of one or more addresses and (2) a type of access;
comparing the address range and type of access against a table of: (1) stored address ranges of one or more addresses and (2) stored types of access associated with any pending host access instructions, the types of access include a third type of access or a blocking read type of access, the third type of access is a type of access other than the blocking read type of access, a read type of access, or a write type of access;
determining whether to execute the host access instruction based at least in part on the comparison; and
in the event it is determined to execute the host access instruction: forwarding the host access instruction for execution; and
storing the address range and the type of access from the host access instruction in the table; and
executing an unlocking procedure includes
  generating a firmware access instruction which includes: (1) all addresses in a user range and (2) the third type of access, determining whether to unlock NAND storage, and in the event it is determined to unlock the NAND storage, generating an indication that the firmware access instruction has completed; or reading and storing one or more configuration settings associated with type of access blocking rules, changing the configuration settings to a blocking read type of access setting, so that the blocking read type of access blocks any subsequent read type of access or subsequent write type of access, generating the firmware access instruction which includes: (1) all the addresses in the user range and a virtual range and (2) the blocking read type of access, determining whether to unlock the NAND storage, and in the event it is determined to unlock the NAND storage, generating the indication that the firmware access instruction has completed, and changing the configuration settings to their stored values.

7. The method recited in claim 6 further comprising:
receiving an indication that a pending host access instruction has completed; and
deleting the stored address range and stored type of access associated with the pending host access instruction that has completed from the table.

8. The method recited in claim 6, wherein the method is performed by a semiconductor device, including one or more of the following: an application-specific integrated circuit (ASIC) or a field-programmable gate array (FPGA).

9. The method recited in claim 8, further comprising using firmware that executes the unlocking procedure on an embedded microprocessor.

10. The method recited in claim 6, wherein determining whether to execute the host access instruction includes:
determining the type of access;
in the event it is determined that the type of access is the read type of access:
  comparing the address range against all stored address ranges having a stored type of access of write;
  determining if there is an overlap between (1) the address range and (2) all stored address ranges having the stored type of access of write;
  in the event it is determined that there is the overlap between (1) and (2), deciding not to execute the host access instruction; and
  in the event it is determined that there is no overlap between (1) and (2), deciding to execute the host access instruction; and
in the event it is determined that the type of access is the write type of access:
  comparing (3) the address range against (4) all stored address ranges, independent of stored type of access;
  determining if there is an overlap between (3) and (4);
  in the event it is determined that there is the overlap between (3) and (4), deciding not to execute the host access instruction; and
  in the event it is determined that there is no overlap between (3) and (4), deciding to execute the host access instruction.

11. A computer program product, the computer program product being embodied in a non-transitory computer readable storage medium and comprising computer instructions for:
receiving, from one of a plurality of channels which are served in parallel, a host access instruction which includes: (1) an address range of one or more addresses and (2) a type of access;
comparing the address range and type of access against a table of: (1) stored address ranges of one or more addresses and (2) stored types of access associated with any pending host access instructions, the types of access include a third type of access or a blocking read type of access, the third type of access is a type of access other than the blocking read type of access, a read type of access, or a write type of access;
determining whether to execute the host access instruction based at least in part on the comparison; and
in the event it is determined to execute the host access instruction: forwarding the host access instruction for execution; and
storing the address range and the type of access from the host access instruction in the table; and
executing an unlocking procedure includes
  generating a firmware access instruction which includes: (1) all addresses in a user range and (2) the third type of access, determining whether to unlock NAND storage, and in the event it is determined to unlock the NAND storage, generating an indication that the firmware access instruction has completed; or reading and storing one or more configuration settings associated with type of access blocking rules, changing the configuration settings to a blocking read type of access setting, so that the blocking read type of access blocks any subsequent read type of access or subsequent write type of access, generating the firmware access instruction which includes: (1) all the addresses in the user range and a virtual range and (2) the blocking read type of access, determining whether to unlock the NAND storage, and in the event it is determined to unlock the NAND storage, generating the indication that the firmware access instruction has completed, and changing the configuration settings to their stored values.

12. The computer program product recited in claim 11 further comprising computer instructions for:
receiving an indication that a pending host access instruction has completed; and
deleting the stored address range and stored type of access associated with the pending host access instruction that has completed from the table.

13. The computer program product recited in claim 11, wherein the computer instructions for determining whether to execute the host access instruction include computer instructions for:
determining the type of access;
in the event it is determined that the type of access is the read type of access:
  comparing the address range against all stored address ranges having a stored type of access of write;
  determining if there is an overlap between (1) the address range and (2) all stored address ranges having the stored type of access of write;
  in the event it is determined that there is the overlap between (1) and (2), deciding not to execute the host access instruction; and
  in the event it is determined that there is no overlap between (1) and (2), deciding to execute the host access instruction; and
in the event it is determined that the type of access is the write type of access:
  comparing (3) the address range against (4) all stored address ranges, independent of stored type of access;
  determining if there is an overlap between (3) and (4);
  in the event it is determined that there is the overlap between (3) and (4), deciding not to execute the host access instruction; and in the event it is determined that there is no overlap between (3) and (4), deciding to execute the host access instruction.

\* \* \* \* \*